United States Patent [19]

Vonsbaek et al.

[11] 4,280,716

[45] Jul. 28, 1981

[54] FOLDABLE WHEEL CHAIR

[75] Inventors: Ebbe Vonsbaek, Roskilde; Claus C. Hansen; Lene Munthe, both of Copenhagen, all of Denmark

[73] Assignee: E.C.-Hospitalsinventor A/S, Denmark

[21] Appl. No.: 118,210

[22] Filed: Feb. 4, 1980

[30] Foreign Application Priority Data

Feb. 5, 1979 [DK] Denmark ............................ 476/79

[51] Int. Cl.³ ............................................ B62B 7/06

[52] U.S. Cl. .................................. 280/642; 280/650; 297/48; 297/DIG. 4

[58] Field of Search ............... 280/641, 642, 650, 647, 280/47.4; 297/48, 16, 46, 17, DIG. 4, 51, 53, 54

[56] References Cited

U.S. PATENT DOCUMENTS

| | | | |
|---|---|---|---|
| 2,301,640 | 11/1942 | Peltier | 280/650 |
| 2,685,325 | 8/1954 | Webster | 280/642 |
| 3,450,432 | 6/1969 | Minsker | 297/17 |

FOREIGN PATENT DOCUMENTS

| | | | |
|---|---|---|---|
| 572079 | 1/1958 | Italy | 297/54 |

*Primary Examiner*—David M. Mitchell
*Attorney, Agent, or Firm*—Bernard, Rothwell & Brown

[57] ABSTRACT

In a foldable wheel chair supporting frames for a back, a seat, a pair of back wheels and a pair of front wheels are mutually pivotally connected by means of pivot assemblies positioned at the seat-back junction and comprising a blocking mechanism which is deactuated for releasing the pivotal connection between the supporting frames by turning the seat in a direction of a predetermined reduction of the angular separation between the seat and the back. Each pivot assembly may comprise a pivot pin secured to one supporting frame, and pivot cams secured to the other supporting frames together with an interlocking cam positioned between two of said pivot cams.

7 Claims, 9 Drawing Figures

FOLDABLE WHEEL CHAIR

The invention relates to a foldable wheel chair of the kind having a back and a seat of a formstable, non-flexible material and two wheel pairs which are individually secured relative to at least three supporting frames pivotally connected with each other with pivot axes extending in parallel relationship to a shaft for one of said wheel pairs by means of only two identical pivot assemblies positioned opposite each other at the back-seat junction and including a blocking mechanism which interlocks the seat supporting frame relative to the wheel supporting frame or frames in the normal operative state of the chair, but may be released to disengage said interlocking engagement by pivotal movement of the seat supporting frame in a direction towards the back supporting frame.

BACKGROUND OF THE INVENTION

In known foldable wheel chairs available on the market the seat and back are usually manufactured from a flexible strong textile material such as canvas, so that the chair is folded around the vertical symmetry plane parallel to the wheels. In such chairs, it is often a disadvantage to the user that the flexible material of the seat and the back does not provide sufficient support. Moreover, even in its folded condition such a chair will normally occupy much space in the vertical direction, since the back may normally not be folded relative to the wheels.

Such a relatively great demand of space is also a disadvantage of a known chair disclosed in Danish Design Application No. 914/1977 which has been published in the Danish Design Journal (Registreringstidende for Monstre) of 15th Feb. 1978. Contrary to most wheel chairs, this known chair is provided with quite small wheels and has in the same manner as ordinary folding chairs a support structure, the mutually pivotally connected parts of which may be pivoted around a pivot axis parallel to the wheel shafts whereby a possibility is provided to use a seat and a back of a formstable, non-flexible material.

Another wheel chair for retarded persons, which chair is foldable by pivotal movement of mutually pivotally connected supporting parts around axes parallel to a wheel shaft, has been disclosed in Danish Design Application No. 394/1977, which has been published in the Danish Design Journal of 1st Dec. 1977. The supporting parts for the seat comprise in this case several mutually pivotally connected link rods which complicate the manufacture and make it more expensive and, furthermore, make folding of the chair and rearrangement of it from a folded condition to the normal operative state more difficult.

From Swedish published patent specification No. 373,325, a foldable baby carriage is known, in which a front wheel supporting frame is pivotally connected with a back wheel supporting frame around an axis parallel to the the wheel axes, whereas the back wheel supporting frame is pivotally connected around an axis displaced in parallel relationship thereto with a U-shaped frame structure forming a handle and being provided in the lower free end in each side with a bent interlocking part engaging a locking bushing on the side pieces of the front wheel supporting frame. The engagement of said interlocking part and said locking bushing, which must be easily movable relative to each other, is released by slightly lifting the handle frame to open the triangular link which in the raised position of the carriage constitute the blocking mechanism, whereby the back wheel supporting frame is allowed to turn against the front wheel supporting frame followed by pivotal movement of the two wheel supporting frames up towards the handle frame. In addition to the fact that the release movement is associated with a considerable risk of unintended folding of the carriage due to the very simple blocking mechanism, the construction requires at least the back to be of a flexible material which due to the reasons mentioned in the foregoing would lead to considerable disadvantages when used in a wheel chair.

In U.S. Pat. No. 3,450,432, a usual folding chair not provided with wheels is disclosed, said chair having a seat and a back of a formstable, non-flexible material. In this case, a limited number of pivotally connected supporting parts, a small demand of space in a folded condition and a simple operation when folding and re-raising the chair, have been obtained in that the seat, the back, a front leg supporting structure and a back leg supporting structure are mutually pivotally connected only by means of two identical pivot assemblies positioned opposite each other at the seatback junction and including a blocking mechanism which is releasable by upwards turning of the seat towards the back. In this known construction, the back is only secured in the normal operative state of the chair relative to the seat by engagement between two opposed shoulder parts on flange portions connected with the seat and the back, respectively, whereby the back is only prevented from turning in a direction to increase the angular separation of the seat and back, whereas it is free to turn in the opposite direction, and no blocking is present between the back and the leg support structures. Thereby, also this construction suffers from a considerable risk of unintendedly folding when a person sitting in the chair leans back heavy enough to turn the seat upwardly beyond a position, in which the pivotal movement of the seat results in folding of the leg support structures. Furthermore, in spite of the intended simplification, reraising of the chair is difficult in that the back must be turned 180° and the seat 270° from the folded condition. Moreover, the two pivot assemblies are not safely synchronized, so that already at a modest heavy or robust manipulation there will be a risk of distortion of the pivot assemblies. Finally, due to the above mentioned movability of the back in the normal operative state, a chiar constructed in this manner will not be suitable for use as a wheel chair.

SUMMARY OF THE INVENTION

Taking as a starting point a simple structural design of a wheel chair according to the same main principles as disclosed in the above mentioned U.S. Patent for an ordinary folding chair, it is the object of the invention to provide a foldable wheel chair offering an improved security against unintended folding, a simplified operation when reraising the chair from a folded condition and an improved security against overloading of the pivot assemblies as a result of heavy manipulation.

According to the invention, a wheel chair is provided, comprising a back and a seat of a formstable, non-flexible material, two wheel pairs, at least three individual supporting frames for said back, said seat and said wheel pairs and two indentical pivot assemblies positioned opposite each other at the back-seat junction for pivotally connecting said supporting frames relative to each other around pivot axes extending in parallel relationship to a shaft for one of said wheel pairs, and including a blocking mechanism for interlocking engagement of the seat and back supporting frames with the supporting frame or frames for said wheel pairs in the normal operative state of the chair, said blocking mechanism including means for releasing said interlocking engagement only in response to a pivotal movement of said seat supporting frame to a predetermined reduction of the angular separation of said seat and back supporting frames, whereby to allow combined pivotal movement of said seat and back supporting frames relative to the supporting frame or frames for said wheel pairs in a direction opposite to the preceding pivotal release movement of said seat supporting frame, parts of said pivot assemblies connected with said seat supporting frame being rigidly connected with each other to syncronize the pivotal movements of the two pivot assemblies.

In the same manner as in the folding chair disclosed in the above mentioned U.S. Patent, the release of the blocking of the pivot assemblies existing in the operative state takes place by turning the seat upwardly towards the back, but contrary to the known construction, a considerable positive reduction of the angular separation of the seat and back will be a condition for the release in the wheel chair according to the invention. Moreover, since the pivotal movement of the seat and back towards the wheels during folding of the chair takes place in the opposite direction relative to the preceding release movement of the seat, a simpler operation is obtained both when folding and reraising the chair. Finally, the rigid interconnection of the parts of the pivot assemblies connected with the supporting frame, viz. the seat supporting frame, by the initial movement of which the complete release is actuated, results in a safe synchronization of the two pivot assemblies and improved safety against overloading thereof.

Structurally simple pivot assemblies may be obtained in that each pivot assembly comprises a pivot pin extending parallel to said wheel shaft and connected with said back supporting frame, a first pivot cam journalled pivotally on said pin and connected with said seat supporting frame and a second pivot cam arranged for pivotal movement relative to said pivot pin and said first pivot cam around a pivot axis displaced in parallel relationship to said pivot pin, said second pivot cam being connected with a wheel supporting frame, said blocking mechanism comprising in each pivot assembly an interlocking cam journalled pivotally on said pivot pin between said first and said second pivot cams in such an operative engagement with said cams that in the angular position of said first pivot cam corresponding to the normal operative state of the chair, it prevents said cam from pivotal movement opposite the release direction, on one hand, and is influenced by said first pivot cam, on the other hand, to prevent relative pivotal movement of said pivot pin and said second pivot cam, whereas in response to pivotal movement of said first pivot cam in the direction of release, it is carried along to release the interlocking engagement between said pivot pin and said second pivot cam.

Such a pivot assembly comprises only relatively few parts, viz. in addition to a pivot pin and said pivot cam connected individually with the mutually pivotal supporting frames, a single interlocking cam.

If the wheel pairs are connected to the same supporting frame, the chair according to the invention may be designed with only three supporting frames. However, a smaller demand of space may be obtained by using four supporting frames. To achieve this, a preferred embodiment of the wheel chair using pivot assemblies as described in the foregoing is designed so that separate supporting frames for a pair of back wheels and a pair of front wheels are connected with said second cam and a third pivot cam, respectively, said third pivot cam being pivotally journalled on said pivot pin on the opposite side of said interlocking cam relative to said second pivot cam, said second pivot cam being constructed to prevent rotary movement of said pivot pin in its blocked condition. Thereby, the front wheels and back wheels of the chair may be brought as close to each other as possible in the folded condition.

BRIEF DESCRIPTION OF THE DRAWINGS

In the following, the invention will be explained in further detail by means of an embodiment thereof and with reference to the accompanying drawings, in which.

DETAILED DESCRIPTION

Figure 2:
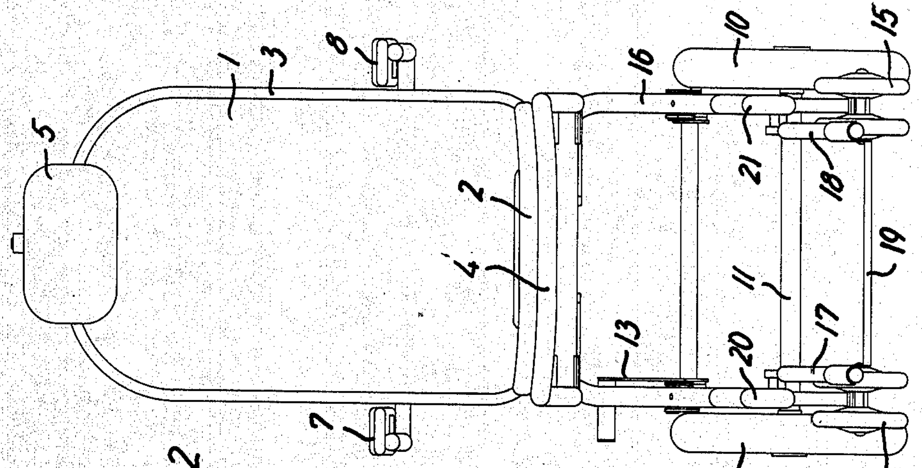
FIGS. 1 to 3 show a wheel chair according to the invention in a side view and a front view in normal operative state and in a folded condition, respectively.

In the embodiment shown, a wheel chair according to the invention comprises a back 1 and a seat 2, each of which is preferably made from a formstable, non-flexible material, said back and seat being secured to a back supporting frame 3 and a seat supporting frame 4, respectively. In a manner known per se, a head back support 5 as well as an operating handle 6 and two armrests 7 and 8 are connected with the back supporting frame 3. The handle 3 and the armrests 7 and 8 are pivotally connected with the back supporting frame 3, so that when folding the chair, they can be pivoted to be substantially coplanar with the back 1, whereas in the operative state illustrated, they are secured against pivotal movement.

The wheel chair has two back wheels 9 and 10 arranged on a rigid shaft 11 forming part of a back wheel supporting frame 12, with which a braking device 13 acting on the back wheels 9 and 10 to block said wheels is pivotally connected in a manner known per se. As shown, the back wheels 9 and 10 are preferably of a size so that they may relatively easily pass smaller obstacles.

Furthermore, the wheel chair has two smaller controlable front wheels 14 and 15, each of which is designed as a twin-wheel in the embodiment shown, and is rotatably connected with a side piece of a front wheel supporting frame 16, with the front end of which side pieces there is pivotally connected two telescopically displaceable connecting rods 17 and 18 for a feet support 19, as well as two handles 20 and 21 to be used together with the operation handle 6 when the chair is to be lifted by two persons.

In the embodiment shown, the supporting frames 3, 4, 12 and 16 are made from relatively rigid pipe profiles which, when the back wheel shaft 11 is considered part of the back wheel supporting frame 12 and the feet support 19 with the telescopically displaceable connecting rods 17 and 18, are considered part of the front wheel supporting frame 16, is of a substantially U-shaped configuration, in which the free ends of the legs are bent inwardly.

Figure 3:
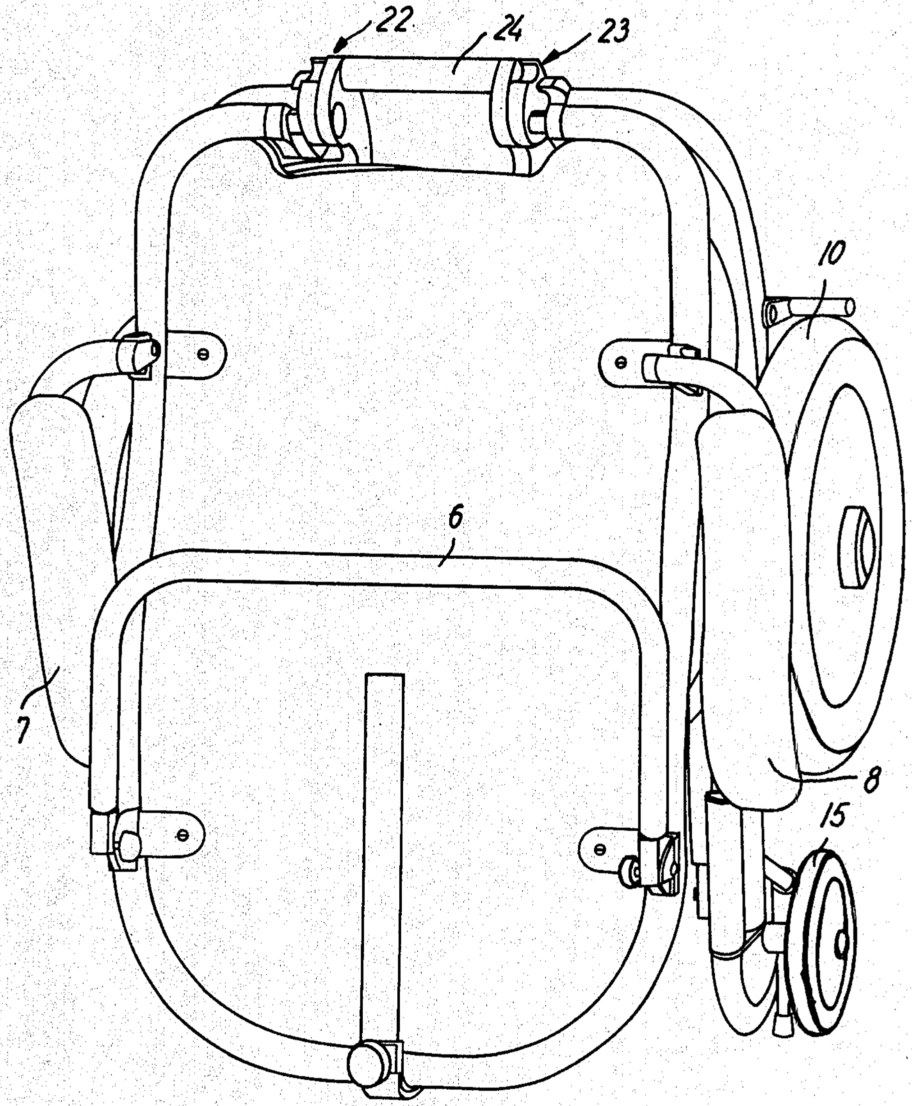

In accordance with the invention, the supporting frames 3, 4, 12 and 16 in the embodiment shown are pivotally connected with each other by means of two pivot assemblies 22 and 23 positioned opposite each other at the back-seat junction of the chair, with which pivot assemblies the free ends of each of the U-shaped supporting frames are connected in the manner more clearly shown in FIG. 3. The two pivot assemblies 22 and 23, the detailed construction of which will be explained in the following, are mutually connected by a pipe piece 24 serving for synchronization of the movements of the pivot assemblies, on one hand, and as carrying handles in the folded condition of the chair shown in FIG. 3, on the other hand.

Due to this construction of the chair, in which the pivotal connections between the supporting frames 3, 4, 12 and 16 are solely locallised to the back-seat junction of the chair, it is obtained, as apparent from FIG. 3, that the chair will occupy as small a space as possible in a folded condition and, in the embodiment shown, will in addition be in a stable balance in an upstanding folded condition, since the upper edge of the back supporting frame 3 and the front wheels 14 and 15 are substantially equally spaced from the pivot assemblies 22 and 23.

Figure 4:
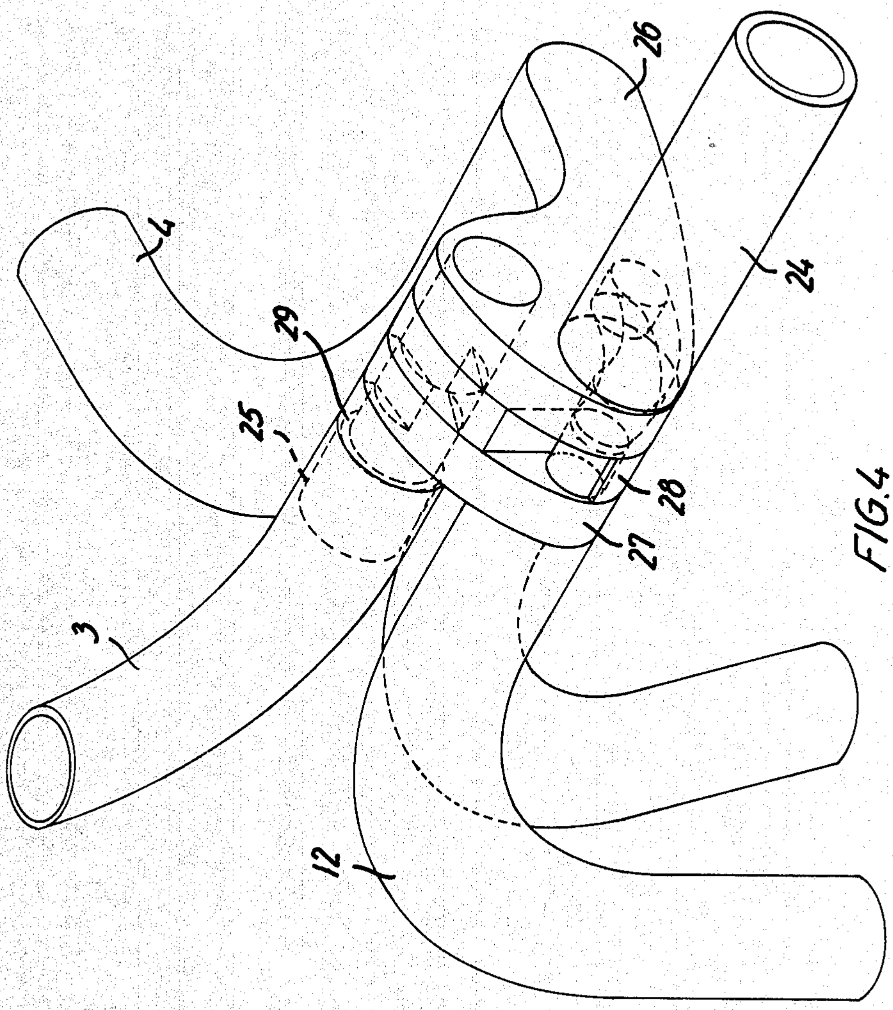
FIG. 4 shows a pivot assembly in the wheel chair shown in FIGS. 1 to 3.

As shown in FIG. 4, each of the pivot assemblies 22 and 23 comprises in the embodiment shown a pivot pin 25 secured in one free end of the pipe profile of the back supporting frame 3, a first pivot cam 26 welded to one free end of the pipe profile of the seat supporting frame 4 and pivotally journalled on the pivot pin 25, a second pivot cam 27 welded to one free end of the pipe profile of the back wheel supporting frame 12, an interlocking cam 28 journalled pivotally on the pivot pin 25 between the pivot cams 26 and 27 and a third pivot cam 29 welded to one free end of the pipe profile of the front wheel supporting frame 16.

As most clearly apparent from FIGS. 5 to 9, each of the pivot cams 26 and 29 and the interlocking cam 28 is formed with cylindrical bores 30, 31 and 32, respectively, adapted to the pivot pin 25 so as to allow rotation of said cams around the axis of the pivot pin. In contradistinction thereto, the pivot cam 27 is arranged for pivotal movement around an axis displaced in parallel relationship to the pivot pin 25, said axis being defined by a pin 33 rigidly connected with the pivot cam 29 and fitting into a cylindrical bore 34 in the pivot cam 27. Furthermore, the pivot cam 27 is formed with a circumferential, hook-shaped cut-out 35 matching an engaging in the normal operative state of the chair shown in FIGS. 1 and 2, a part 36 of the pivot pin 25 having a non-rotational symmetrical cross-section provided, for example, by means of diametrically opposed cut-outs having an axial length corresponding to the thickness of the pivot cam 27. Moreover, in the normal operative state of the chair, a pin 37 rigidly connected with the pivot cam 27 engages a circumferential hook-shaped cut-out 38 in the interlocking cam 32. Finally, a pin 39 rigidly connected with the interlocking cam 32 engages in a non-removable manner a circular guide way 40 formed in the side of the first pivot cam 26 facing the interlocking cam 28 coaxially with the bore 30.

Figure 1:
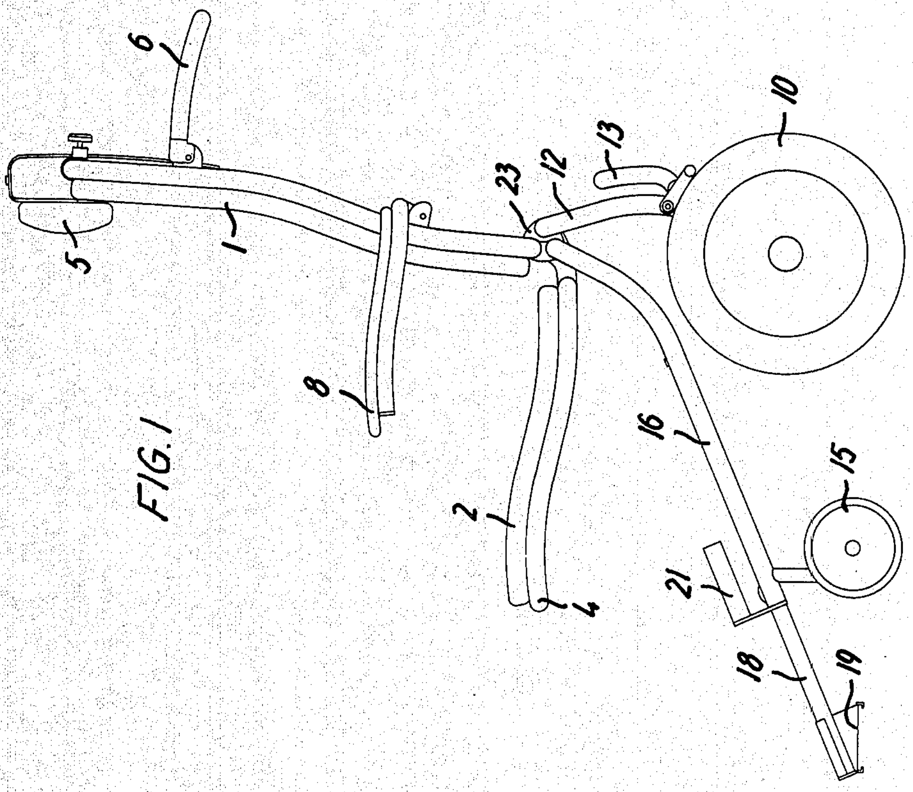
Figure 5:
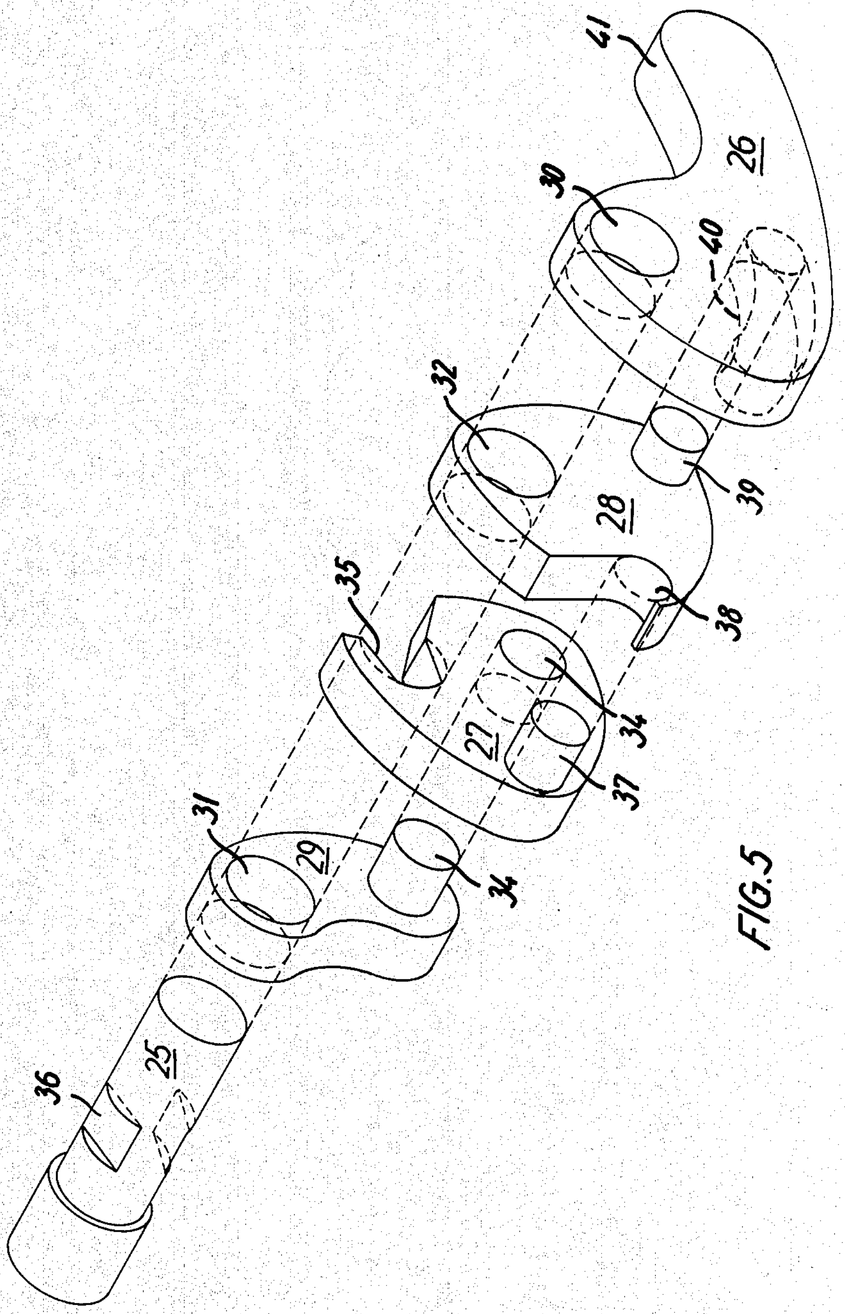
FIGS. 5 to 9 illustrate the positions of the individual elements of the pivot assembly in different functional states.

FIG. 5 illustrates the positions assumed by the pivot cams 26, 27 and 29 and the interlocking cam 28 relative to each other and the pivot pin 25 in the normal operative state of the chair shown in FIGS. 1 and 2, in which the angular separation of the seat 2 and the back 1 is approximately 90°. Since the seat supporting frame 4, as shown in FIG. 4, is secured to a protruding arm 41 on the pivot cam 26, the weight of the seat 2 with or without a person sitting thereon will keep the hook-shaped cut-out 35 on the second pivot cam 27 in firm engagement with the part 36 of the pivot pin 25 having a non-rotational symmetrical cross-section due to the engagement of the guide way 40 and the pin 39 connected with the interlocking cam 28, on one hand, and the engagement of the cut-out 38 of the interlocking cam 28 and the pin 37 of the second pivot cam 27. Due to the engagement of the pin 39 with the guide way 40, pivotal movement of the seat connected with the pivot cam 26 in a downwards direction will, thereby, be prevented. Due to the engagement of the pin 37 and the hook-shaped cut-out 38 of the interlocking cam 28 and the engagement of the hook-shaped cut-out 35 of the pivot cam 27 and the part 36 of the pivot pin 25 having a non-rotational symmetrical cross-section, the back wheel supporting frame 12 connected with the pivot cam 27 will, furthermore, be effectively locked and, simultaneously, the pivot pin 25 will be blocked due to the latter engagement against rotation relative to the pivot cams 26, 27 and 29. Moreover, due to the locking of the pivot cam 27, the pivot cam 29 will be prevented from turning relative to any of the other parts.

Thereby, for each pivot assembly, a locking mechanism is obtained which secures an effective mutual interlocking engagement of the relatively pivotal supporting frames in the normal operative state of the chair.

Figure 6:
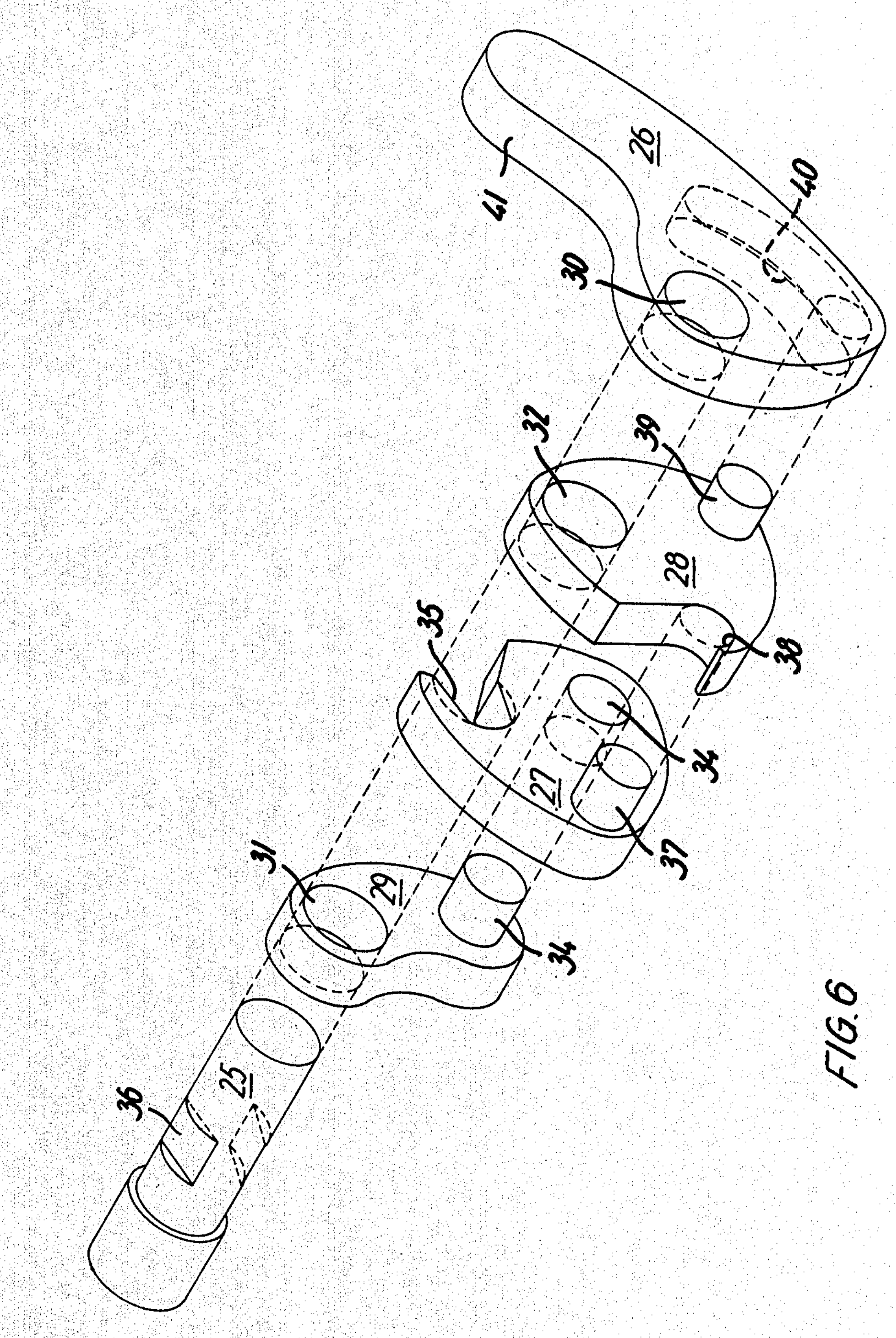
Figure 7:
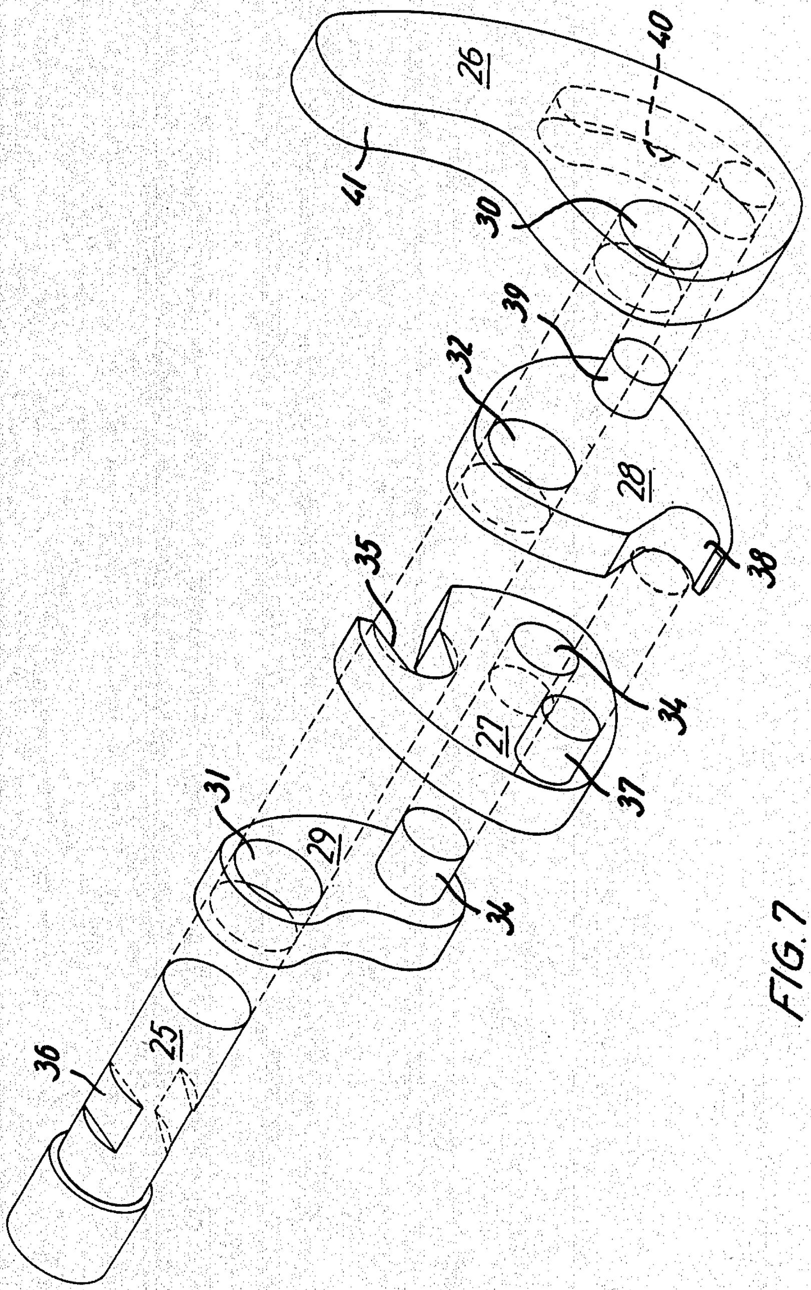
Figure 8:
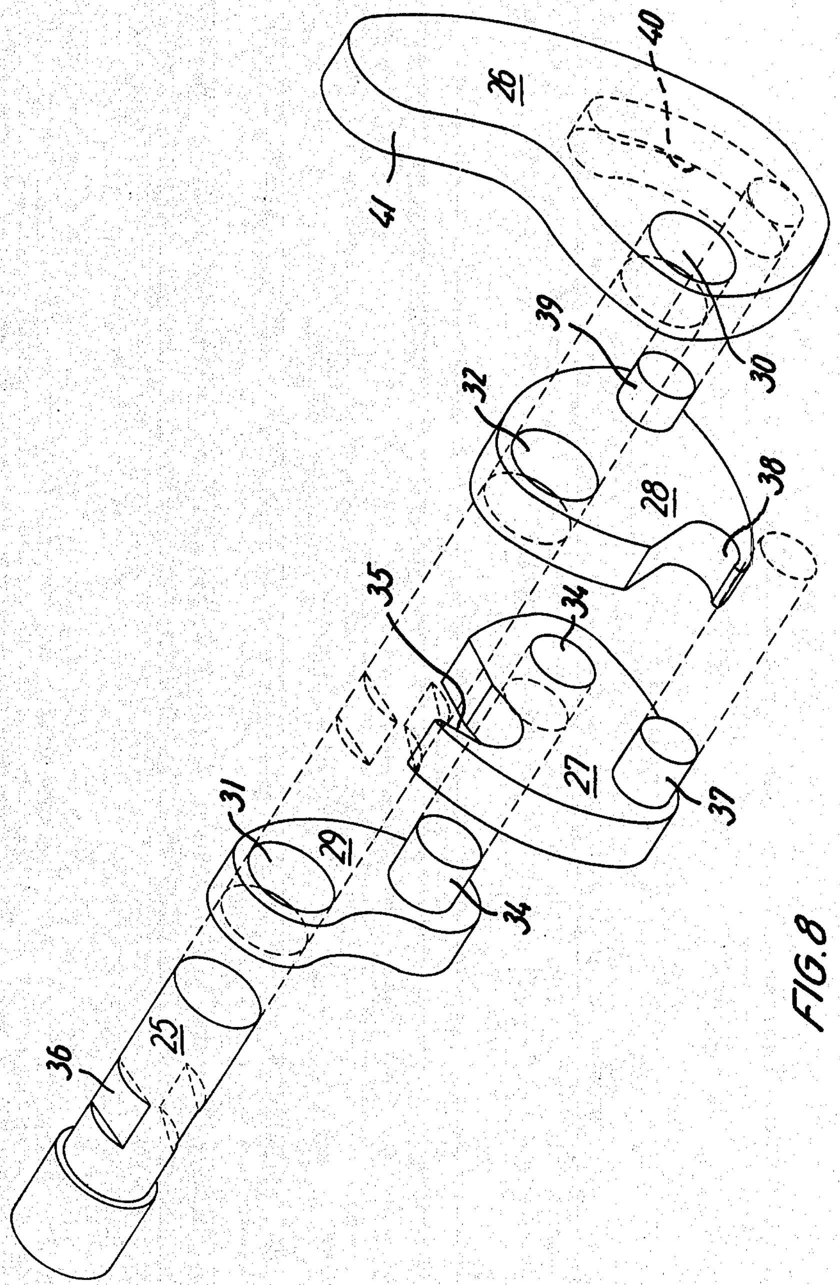
Figure 9:
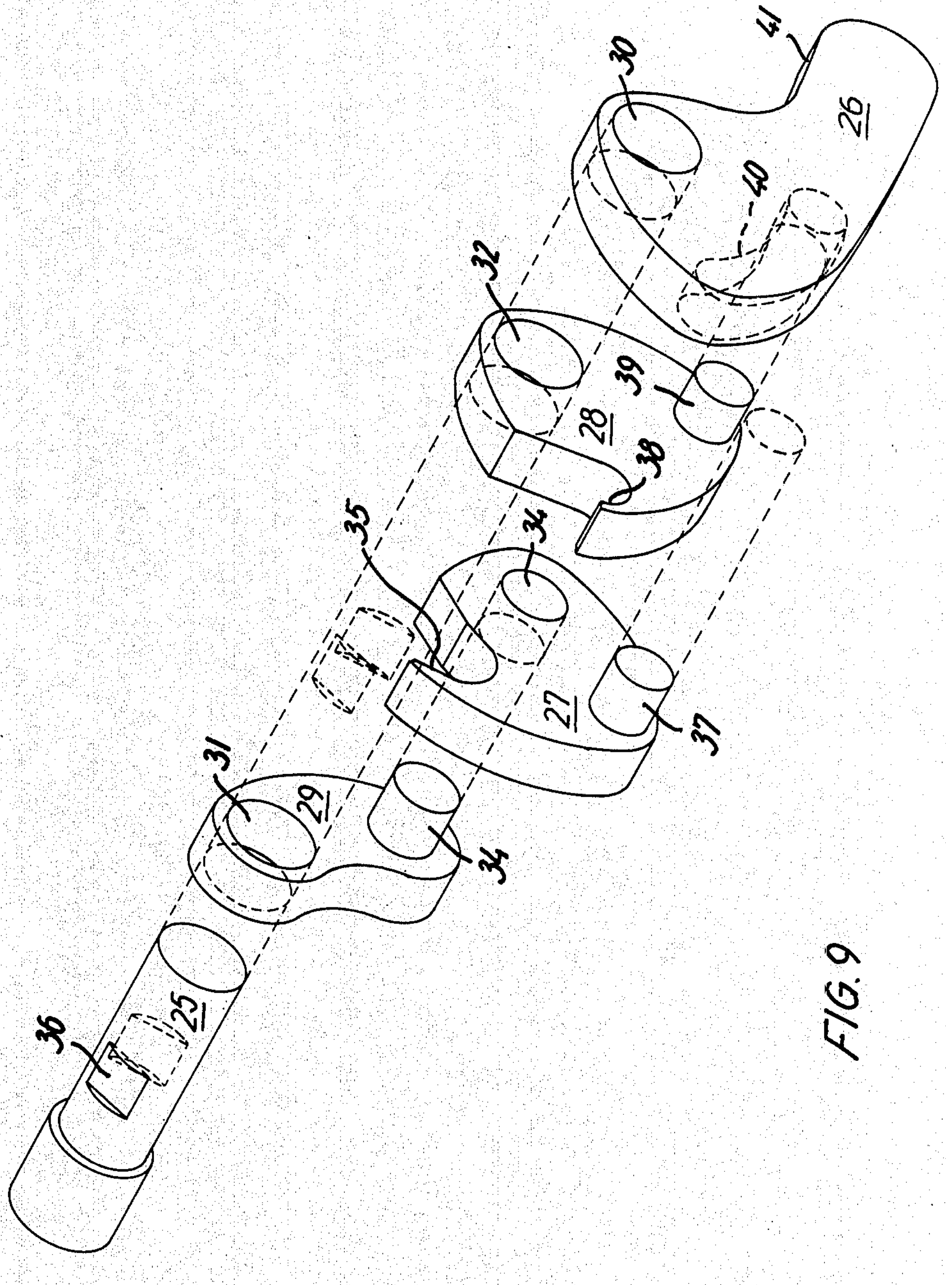

As illustrated in FIGS. 6 and 7, this blocking mechanism is released in accordance with the invention by pivotal movement of the pivot cam 26 around the pivot pin 25 corresponding to pivotal movement of the seat 2 towards the back 1. In the position shown in FIG. 6, the pivot cam 26 has been turned to an extent, by which the pin 39 connected with the interlocking cam 28 will now be encircled by the opposite end of the guide way 40 relative to the position shown in FIG. 5. However, in this position, the pin 37 connected with the pivot cam 27 will still be in engagement with the hook-shaped cut-out 38 in the interlocking cam 28, so that the back wheel supporting frame 12, the front wheel supporting frame 16 and the back supporting frame 3 will still be secured relative to each other. However, by continuous pivotal movement of the seat 2 upwardly towards the back 1, the engagement between the pin 37 and the hook-shaped cut-out 38 will be released, such as shown in FIG. 7, and since the pivot cam 27 is pivotally movable around a pivot axis displaced in parallel relationship to the pivot pin 25, as defined by the pin 33, the pivot cam 27 may now be turned in the same direction as the pivot cam 26 and the interlocking cam 28 carried along by the pivotal movement of the latter, corresponding to a pivotal movement of the back wheel supporting frame 12 towards the front wheel supporting frame 16, the side pieces of which have such a lateral separation that the back wheels 9 and 10 may pass outside said side pieces. Subsequent to this pivotal movement of the pivot cam 27, the parts 25 to 29 assume mutual positions, as shown in FIG. 8. By the pivotal movement of the pivot cam 27, the engagement between the hook-shaped cut-out 35 and the part 36 of the pivot pin 25 having a non-rotational symmetrical cross-section is released, and the pivot pin 25 may now be turned relative to the cams 26, 28 and 29, such as shown in FIG. 9, corresponding to folding of the back 1 and the seat 2 which has been turned upwardly against the back in a downwards direction towards the folded wheel supporting frames 12 and 16.

Thus, it will be apparent that folding of the chair from the operative state shown in FIGS. 1 and 2 requires pivotal movement of the seat 2 upwardly towards the back 1 to a predetermined reduction of the angular separation of the seat 2 and the back 1, before the blocking mechanism of pivot assemblies 22 and 23 may be released. For reasons of security, the prescribed reduction of the angular separation should preferably amount to about half the angular separation of the back 1 and the seat 2 in the operative state, i.e. about 45°, such as apparent from FIGS. 5 to 9. By continued pivotal movement of the seat 2 beyond this prescribed reduction of the angular separation, the back wheel supporting frame may be pivoted towards the front wheel supporting frame, and after this the seat and the back may be folded over the two wheel supporting frames. Thereby, a possibility for another simple folding of the chair is obtained, since after actuation of the braking device 13 to block the back wheels 9 and 10, only a pivotal movement of the seat 2 upwardly towards the back 1 and a slightly backwardly directed pressure on the back and the seat will be required, whereby the complete chair will be folded. Before this operation, the head back support 5 is displaced downwardly so as to be positioned within the back 1, and the operating handle 6 serving as a pushing device, and the arm rests 7 and 8 are pivoted to a co-planar position relative to the back 1, in addition to which the telescopic connecting rods 17 and 18 ae pressed and pivoted towards the front wheel supporting frame 16. When, subsequently, the chair is to be reraised from the folded condition shown in FIG. 3 to the normal operative state shown in FIGS. 1 and 2, it is laid down from the upright position shown in FIG. 3, so that the wheels rest on the support, whereafter the back 1 and the seat 2 are pivoted outwardly to the angular position shown in FIG. 1 relative to the front wheel supporting frame 16, and the back wheel supporting frame 12 is turned into place to lock the back supporting frame 3 by engagement between the pivot cam 27 and the pivot pin 25. Thereafter, the back wheel supporting frame 12 is locked by downwards pivotal movement of the seat 2 to the operative state, after which the auxiliary means 5, 6, 7 and 8 as well as 17, 18 and 19 may be brought into place. Thus, operation of the chair is very simple, since no operations to secure separate interlocking means positioned at different places relative to the supporting frames are required.

The invention is not limited to the embodiment of the wheel chair shown in the drawings, since the feature essential to the invention that the supporting frames are mutually connected by means of pivot assemblies of the seat-back junction associated with a blocking mechanism which is deactuated by turning the seat upwardly towards the back may also be used in a chair having only three main supporting frames for the back, the seat and both wheel pairs, respectively. If a pivot assembly as illustrated in FIGS. 4 to 9 is used in such an embodiment, the pivot cam 29 may be dispensed with, whereby the pin 33 defining the pivot axis for the pivot cam 27 displaced in parallel relationship to the pivot pin 25 may instead be firmly connected with the wheel supporting frame. However, in such an embodiment, the chair will occupy a little more space in a folded condition than shown in FIG. 3. Similarly, the design of the individual parts of the pivot assembly shown in FIGS. 4 to 9 represents only a practically suitable embodiment which can be modified without difficulties.

What is claimed is:

1. A foldable wheel chair, comprising a back and a seat of a formstable, non-flexible material, two wheel pairs, at least three individual supporting frames for said back, said seat and said wheel pairs and two identical pivot assemblies positioned opposite each other at the back-seat junction for pivotally connecting said supporting frames relative to each other around pivot axes extending in parallel relationship to a shaft for one of said wheel pairs, and including a blocking mechanism for interlocking engagement of the seat and back supporting frames with the supporting frame or frames for said wheel pairs in the normal operative state of the chair, said blocking mechanism including means for releasing said interlocking engagement only in response to a pivotal movement of said seat supporting frame to a predetermined reduction of the angular separation of said seat and back supporting frames, and to allow combined pivotal movement of said seat and back supporting frames relative to the supporting frame or frames for said wheel pairs in a direction opposite to the preceding pivotal release movement of said seat supporting frame, parts of said pivot assemblies connected with said seat supporting frame being rigidly connected with each other to syncronize the pivotal movements of the two pivot assemblies.

2. A wheel chair as claimed in claim 1, wherein said predetermined reduction amounts to at least half the angular separation of said seat and said back in the normal operative state of the chair.

3. A wheel chair as claimed in claim 1, wherein each pivot assembly comprises a pivot pin extending parallel to said wheel shaft and connected with said back supporting frame, a first pivot cam journalled pivotally on said pivot pin and connected with said seat supporting frame and a second pivot cam arranged for pivotal movement relative to said pivot pin and said first pivot cam around a pivot axis displaced in parallel relationship to said pivot pin, said second pivot cam being connected with a wheel supporting frame, said blocking mechanism comprising in each pivot assembly an interlocking cam journalled pivotally on said pivot pin between said first and said second pivot cams in such an operative engagement with said cams that in the angular position of said first pivot cam corresponding to the normal operative state of the chair, it prevents said cam from pivotal movement opposite the release direction, on one hand, and is influenced by said first pivot cam, on the other hand, to prevent relative pivotal movement of said pivot pin and said second pivot cam, whereas in response to pivotal movement of said first pivot cam in the direction of release, it is carried along to release the interlocking engagement between said pivot pin and said second pivot cam.

4. A wheel chair as claimed in claim 3, comprising four supporting frames, wherein separate supporting frames for a pair of back wheels and a pair of front wheels are connected with said second pivot cam and a third pivot cam, respectively, said third pivot cam being pivotally journalled on said pivot pin on the opposite side of said interlocking cam relative to said second pivot cam, said second pivot cam being constructed to prevent rotary movement of said pivot pin in its blocked condition.

5. A wheel chair as claimed in claim 3, wherein said interlocking cam is in engagement with said first pivot cam by means of a pin secured in one of said cams and being guided in a circular guideway formed in the other of said cams concentrically with the axis of said pivot pin and having a circumferential length corresponding to the predetermined pivotal movement of said seat supporting frame to release the blocking mechanism, said interlocking cam being in engagement with said second pivot cam by means of a pin secured in one of said cams and a hook-shaped circumferential cut-out in the other of said cams.

6. A wheel chair as claimed in claim 3, wherein a hook-shaped circumferential cut-out is formed in said second pivot cam to match a portion of said pivot pin of a non-circular cross-section.

7. A wheel chair as claimed in claim 4, wherein said second pivot cam is journalled on a further pivot pin connected with said third pivot cam and displaced relative to said pivot pin.

* * * * *

UNITED STATES PATENT AND TRADEMARK OFFICE
CERTIFICATE OF CORRECTION

PATENT NO. : 4,280,716

DATED : July 28, 1981

INVENTOR(S) : Vonsbaek et al.

It is certified that error appears in the above-identified patent and that said Letters Patent are hereby corrected as shown below:

On Page 1, line 5, the name of the assignee has been incompletely indicated and is also misspelled. The correct and complete name is as follows:

--E.C.-HOSPITALSINVENTAR A/S (Edmund Christensens Eftf.)--.

Column 1, line 60, delete extra "the".

Column 2, line 50, delete "chiar" and substitute therefor --chair--.

Column 5, line 52, delete "an" and substitute --and--.

Column 7, line 33, delete "ae" and substitute --are--.

Signed and Sealed this

***Second* Day of *February 1982***

[SEAL]

*Attest:*

GERALD J. MOSSINGHOFF

*Attesting Officer* *Commissioner of Patents and Trademarks*